B. E. MAXWELL.
SKIVING MACHINE.
APPLICATION FILED NOV. 18, 1920.
1,388,358.
Patented Aug. 23, 1921.
2 SHEETS—SHEET 1.
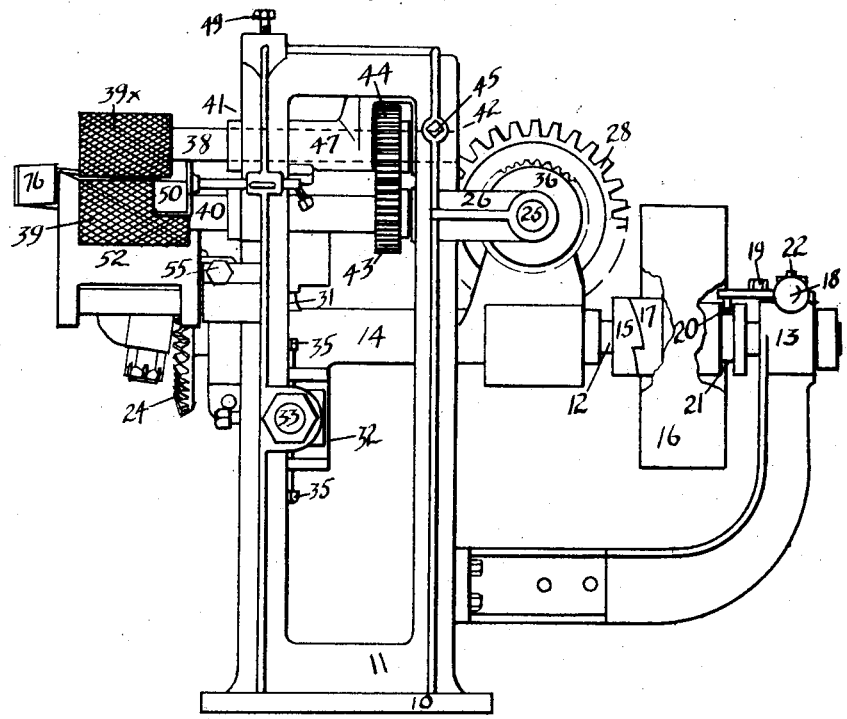
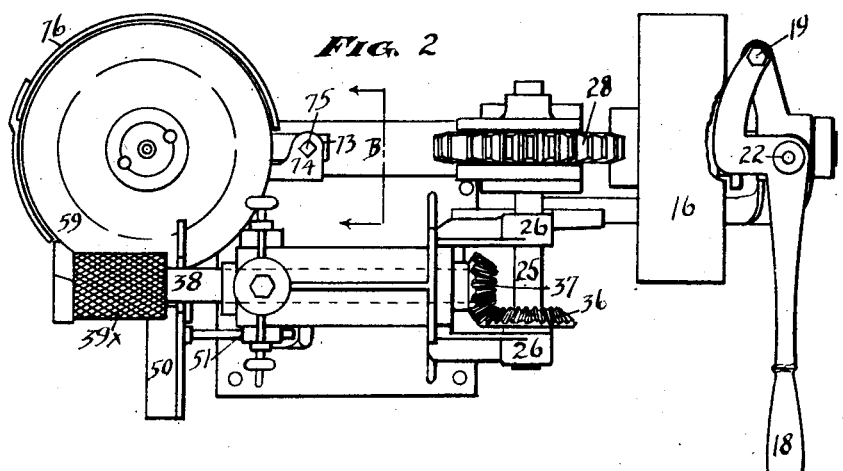
WITNESS:
Wm. C. Edwards Jr.
INVENTOR
Bert E. Maxwell
BY
U. G. Charles
ATTORNEY

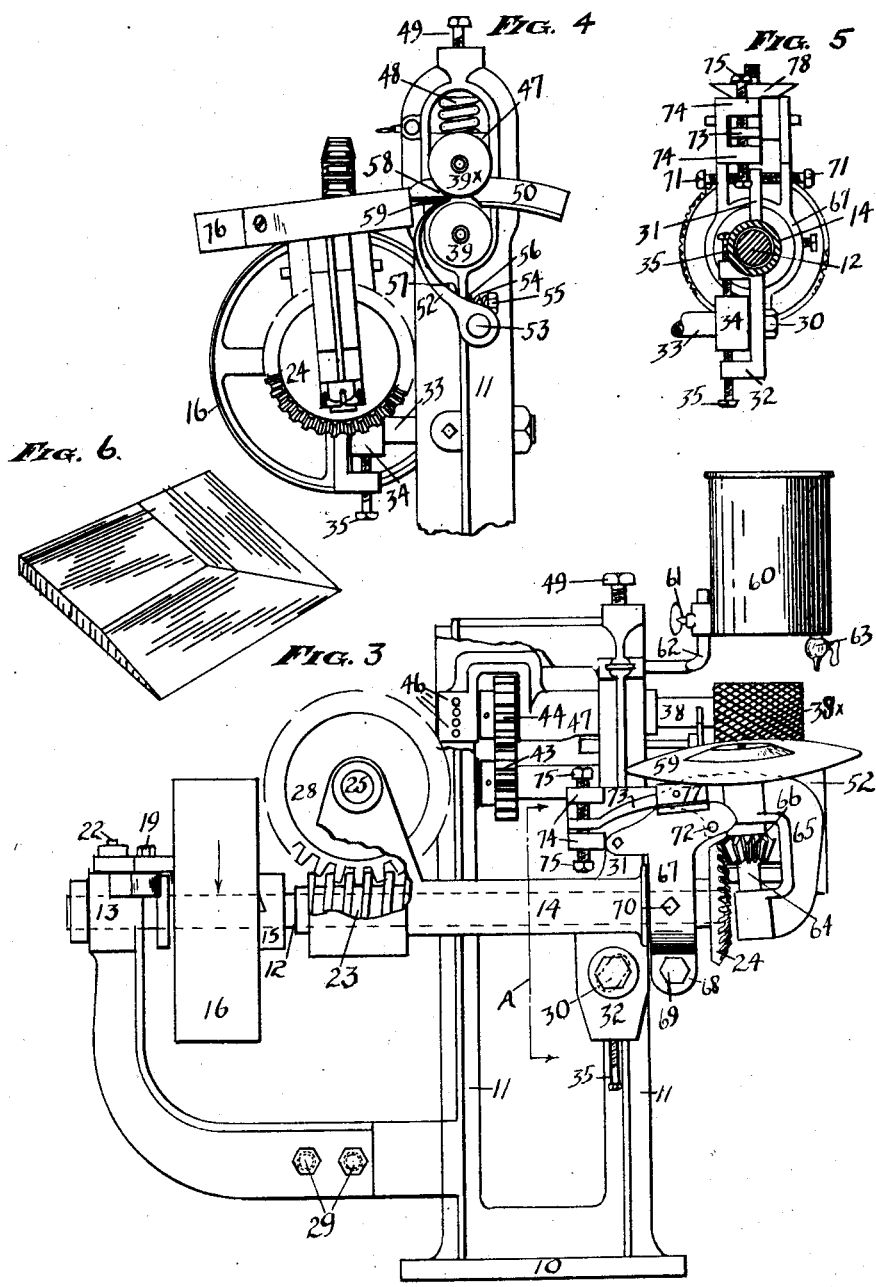

UNITED STATES PATENT OFFICE.

BERT E. MAXWELL, OF WICHITA, KANSAS.

SKIVING-MACHINE.

1,388,358.

Specification of Letters Patent. Patented Aug. 23, 1921.

Application filed November 18, 1920. Serial No. 424,932.

*To all whom it may concern:*

Be it known that I, BERT E. MAXWELL, a citizen of the United States, residing at Wichita, in the county of Sedgwick and State of Kansas, have invented certain new and useful Improvements in a Skiving-Machine, of which the following is a description, referring to the drawings accompanying this specification.

The invention relates to a machine adapted and arranged to cut on a bevel, the edges of any pliable materials and especially the fabricated part of an old pneumatic tire casing adapted for making blow out patches, or reliners.

In the drawings Figure 1 is a front elevation of the skiving machine. Fig. 2 is a top view of the machine seen in Fig. 1. Fig. 3 is a rear elevation of the machine seen in Fig. 1 and includes the water tank. Fig. 4 is a fragmentary side view of the left hand portion of the machine seen in Fig. 1. Fig. 5 is a sectional view taken along line A in Fig. 3 and looking in the direction of the arrows, the view being confined to the shaft driving the disk cutter; this view corresponds to the sectional view taken along the line B in Fig. 2, looking in the direction of arrows. Fig. 6 represents a fragment of material as beveled on two of its sides; this fragment of material may be the fabricated part of an old tire casing such as is often used in the manufacture of blow out patches, or reliners.

Referring to the drawings; supported from its base 10 is a framework 11 for the skiving machine. A drive shaft 12 is horizontally mounted in bearings 13, 14 on portions carried by the frame. At 15 is a clutch face of the ratchet type, rigidly mounted on the shaft 12. The pulley wheel 16 for driving the shaft 12 is provided with a clutch face 17 adapted to engage the ratchet 15 when inwardly moved on the shaft 12 for such engagement. The lever 18, pivotally mounted at 19 carries a pin 20 engaging the annular groove 21 in the hub of the pulley 16. In the elbow of the lever 18 at 22 is seen a spring striker.

By means of lever movements, the pin 20 engages the pulley face 17 with the clutch face 15 for driving purposes; similarly the lever 18 disengages the clutch as will be readily understood. In the bearing 13 are two seats (not shown) within which the striker 22 engages to hold the machine in or out of gear, as desired. The housing 14 also incloses the worm 23 rigid with the shaft 12. Beyond the housing 14 the shaft 12 terminates in a bevel gear 24.

A transverse shaft 25 housed in bearings 26, 26 rigid with the frame 11, carries the gear 28 in mesh with the worm 23. The shaft 12 and its housings are adjustably mounted to the frame 11; the housing 14 pivoting on the shaft 25. The object of this adjustment is to raise or lower the cutting disk of the machine, later disclosed, and is accomplished by loosening the bolts 29, 30 to permit of such pivoting of the shaft housings, when the bolts 29 and 30 are again tightened.

At 31, a web extends upwardly from the housing 14 and at 32 a channel-like web depends from the housing 14. The bolt 33 rigid with the frame 11 carries an end member 34 against which set screws 35, 35 in the web 32 bear against and secure the parts at their desired position when pivoted; the web 32 being provided with a diagonal slot through which the bolt 30 passes to engage the member 34. This elongated slot is shown dotted behind the bolt head 30 in Fig. 3 and permits of this pivot movement within its limits and the position as controlled by the set screws 35.

The shaft 25 transmits power from the worm 23 and gear 28 to the bevel gear 36 which meshes with the bevel gear 37 on the feed roller shaft 40 carrying the feed roller 39. Above the shaft 40 is seen a feed roller shaft 38 housed at 41, 42 in the frame 11, also carrying a feed roller $39^x$. The shaft 38 carries a pinion 44 in driven engagement with a pinion 43 carried by the shaft 40. The shaft 38 and pinion 44 are adjustably mounted in the frame 11 by means of the set screw 45 which seats in any one of the selected depressions as shown at 46 arranged in the boxing connecting with the housing 47 following along the shaft 38, all of which is slidably mounted in the yoke of the frame 11 as seen in Fig. 4 and the rollers are tensioned by the spring 48 with adjusting bolt 49 by which means a desired tension is obtained between the rollers 39, $39^x$. The rollers 39, $39^x$ have milled faces.

The material is fed between the rollers along a gage 50 adjustably supported by members 51 attached to the frame 11. Upon passing through the rollers the material is abruptly curved, passing over the bottom roller and following the curve of the guide 52. This guide is pivotally mounted at 53 and adjustably tensioned by the spring 54 which is seated on the bolt 55 passing through the web of the frame 11 at 56 and entering a lug on the guide 52 at 57. By this means the curved guide 52 is adjustably set to accomodate the varying thicknesses of materials in process of skiving. The skiving takes place near the diametrical axis of the rollers as shown at 58, where the cutting disk 59, traveling at a high speed engages the material as fed toward it by the rollers. Soapy water slowly dripping from a tank 60, rigidly secured by means of the set screw 61 to the arm 62 attached to the frame 11, as discharged through the stop cock 63 to strike upon the disk 59, prevents burning or binding during the cutting process.

The disk 59 is mounted on an upright shaft 64, journaled in the frame 65 and provided with the bevel gear 66 engaging the bevel gear 24. The teeth of these gears are made sufficiently deep so that the pivotal adjustment of the bearings 13, 14 will not interfere with the proper meshing of the gears, sufficient to drive the disk arbor perfectly.

To tilt the disk 59 transversely to the axis of the drive shaft 12, a collar band 67 is mounted on the housing 14, this collar 67 is split at the bottom and provided with ears 68 through which passes the bolt 69 for rigid clamping purposes and the set screw 70 assists in maintaining a desired fixed position of said collar on the housing 14 when adjusted thereupon by means of the screws 71, 71 adjustably contacting the opposite sides of the web member 31 of the housing 14.

To slant the cutting disk 59 longitudinally with the shaft 12, the frame 65 is pivotally mounted at 72. An arm 73 of the frame 65 extends between portions 74, 74 rigid with the collar 67 and by means of set screws 75, 75 carried by the portions 74, as adjusted, the arm 73 may be raised or lowered so that this disk 59 can be set at the desired angle.

In Fig. 3 the disk guard 76, seen in Fig. 2, has been removed to disclose the lug 77 on the arm 73 to which it is normally attached. In Fig. 5, the disk 59 has been removed from its mandrel 78 for convenience of illustration.

Having fully described my invention, what I now claim as new and desire to secure by Letters Patent is covered by the appended claims, reserving the right to such modifications as are properly covered by same.

1. A skiving machine including a framework, a drive shaft carried by said frame; said drive shaft carrying a worm, a bevel gear and a clutch; a pulley wheel rotatably mounted on said drive shaft and a clutch face on said wheel, means for engaging said pulley wheel face to said clutch face and for disengaging same when desired, said means including a shifting lever and parts carried by said lever in engagement with parts on said pulley wheel; a disk cutter on a shaft operable through a bevel gear in mesh with bevel gear on said drive shaft; a jack shaft carrying a worm gear in mesh with the worm on said drive shaft; a bevel gear on said jack shaft; a roller shaft housed in the framework, a bevel gear on said shaft in meshed engagement with the bevel gear on said jack shaft and a roller carried by said roller shaft; a second roller shaft carrying a second roller arranged in parallelism with the driven roller and pinions on said roller shafts in meshed engagement; the said disk cutter being adapted to revolve adjacent the diametrical axis of said paired rollers during machine operation for the purposes as specified.

2. A skiving machine including a frame, a drive shaft carried in housings supported by said frame; said drive shaft having a worm, a bevel gear and a clutch rigid thereon; a pulley wheel rotatably mounted on said shaft and a clutch face on said wheel and means including a shifting lever and parts thereon for engaging said pulley wheel clutch face to said clutch when desired or to disengage it therefrom; a jack shaft carrying a worm gear in mesh with the worm on said drive shaft, said jack shaft being housed in bearings rigid with said frame and pivotally supporting a housing carrying said drive shaft and means carried from the framework for adjustably securing said drive shaft housings in a desired pivoted position on said jack shaft; a bevel gear on said jack shaft, a roller shaft housed in said framework, a bevel gear thereon in meshed engagement with the bevel gear on said jack shaft and a roller carried by said roller shaft; a second roller shaft and roller adjustably arranged in said framework in parallelism with said driven roller shaft and pinions on said roller shafts in meshed engagement; a gage carried by said framework for guiding materials toward said paired rollers and a curved guide adjustably arranged adjacent one of said rollers; a collar adjustably engaging a housing of said drive shaft and means for changing to and maintaining said collar in desired fixed positions; a shaft housed in a hinged frame, said frame pivotally engaging said collar, adjustable means for arranging and maintaining said frame and shaft in a desired fixed position, a bevel gear on this shaft in meshed engagement with the bevel gear on the drive shaft and a disk cutter carried by said shaft arranged to revolubly operate during machine operation in proximity to the diametrical axis of said rollers, all for the purposes and in the manner substantially as specified.

BERT E. MAXWELL.

Witnesses:
M. Y. CHARLES,
W. A. NETHERCOT.